United States Patent
Hoshino et al.

(10) Patent No.: US 8,837,886 B2
(45) Date of Patent: Sep. 16, 2014

(54) OPTICAL FIBER CABLE HAVING A SHEATH AND FOR SETTING IN A CONDUIT

(75) Inventors: Yutaka Hoshino, Chiyoda-ku (JP); Masayoshi Tsukamoto, Chiyoda-ku (JP); Koichi Mizuno, Chiyoda-ku (JP); Eiji Konda, Chiyoda-ku (JP); Keiichiro Sugimoto, Tsukuba (JP); Shinichi Niwa, Tsukuba (JP)

(73) Assignees: Furukawa Electric Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/054,968

(22) PCT Filed: Aug. 6, 2009

(86) PCT No.: PCT/JP2009/063918
§ 371 (c)(1),
(2), (4) Date: Jan. 20, 2011

(87) PCT Pub. No.: WO2010/016535
PCT Pub. Date: Feb. 11, 2010

(65) Prior Publication Data
US 2011/0150402 A1    Jun. 23, 2011

(30) Foreign Application Priority Data
Aug. 7, 2008 (JP) .................. 2008-204563

(51) Int. Cl.
*G02B 6/44* (2006.01)
(52) U.S. Cl.
CPC .............. *G02B 6/443* (2013.01); *G02B 6/4402* (2013.01)
USPC .......................................... 385/102; 385/100
(58) Field of Classification Search
None
See application file for complete search history.

(56) References Cited

U.S. PATENT DOCUMENTS 5,561,731 A * 10/1996 Cooke et al. .................. 385/114
6,060,541 A *  5/2000 Anderson et al. ............... 524/22
(Continued)

FOREIGN PATENT DOCUMENTS

GB    2193583         2/1988
JP    01190762 A *    7/1989    ............... C09D 3/72
(Continued)

OTHER PUBLICATIONS

Kurosawa, Yoshinori et al., "Hikari Cable-yo Tei Masatsu Sheath no Kento", NEN IEICE Communications Society Taikai Koen Ronbunshu, 2, p. 364 (lecture No. B-10-42), (Sep. 7, 1998).

(Continued)

*Primary Examiner* — Mark Robinson
*Assistant Examiner* — Andrew Jordan
(74) *Attorney, Agent, or Firm* — Oblon, Spivak, McClelland, Maier & Neustadt, L.L.P.

(57) ABSTRACT

An optical fiber cable which is suitably set in a conduit by pushing the optical fiber cable into the conduit so as to insert the optical fiber cable through the conduit and which does not reduce the ease of manufacture and the mechanical characteristics of the optical fiber cable. The optical fiber cable includes an optical fiber cable core wire and a sheath covering the optical fiber cable core wire, wherein a dynamic friction coefficient between a surface of the sheath of the optical fiber cable and a surface of a sheath of another optical fiber cable is 0.17 to 0.34, and a dynamic friction coefficient between the surface of the sheath of the optical fiber cable and a surface of a sheet composed of polyvinyl chloride is 0.30 to 0.40.

4 Claims, 3 Drawing Sheets

(56) References Cited

U.S. PATENT DOCUMENTS

| | | | |
|---|---|---|---|
| 6,133,931 A * | 10/2000 | Yoshikawa et al. | 347/213 |
| 6,398,190 B1 * | 6/2002 | Li | 254/134.4 |
| 6,597,846 B1 * | 7/2003 | Fujii et al. | 385/123 |
| 7,321,709 B2 | 1/2008 | Yokokawa et al. | |
| 7,455,941 B2 * | 11/2008 | Evans et al. | 430/69 |
| 7,813,606 B2 * | 10/2010 | Yasutomi et al. | 385/113 |
| 2003/0044138 A1 | 3/2003 | Kusakari et al. | 385/113 |
| 2003/0133676 A1 * | 7/2003 | Kobayashi et al. | 385/113 |
| 2004/0087759 A1 * | 5/2004 | Malik et al. | 528/403 |
| 2007/0134502 A1 * | 6/2007 | Fonda | 428/447 |
| 2007/0141493 A1 * | 6/2007 | Evans et al. | 430/69 |
| 2008/0037940 A1 * | 2/2008 | Park | 385/100 |
| 2008/0220355 A1 * | 9/2008 | Kamoi et al. | 430/66 |
| 2010/0322573 A1 * | 12/2010 | Yasutomi et al. | 385/102 |
| 2011/0150402 A1 * | 6/2011 | Hoshino et al. | 385/102 |
| 2013/0040234 A1 * | 2/2013 | Zhang et al. | 430/70 |

FOREIGN PATENT DOCUMENTS

| | | |
|---|---|---|
| JP | 2000 193856 | 7/2000 |
| JP | 2001-035265 | 2/2001 |
| JP | 2001 264601 | 9/2001 |
| JP | 2003-043324 | 2/2003 |
| JP | 2004 272069 | 9/2004 |
| JP | 2006-163209 | 6/2006 |
| JP | 3929629 | 3/2007 |
| JP | 2007 272199 | 10/2007 |
| JP | 2008-129062 | 6/2008 |
| WO | 93/05424 | 3/1993 |
| WO | 2006 051898 | 5/2006 |
| WO | WO 2008-090880 A1 | 7/2008 |

OTHER PUBLICATIONS

Nakamura, Hiroshi et al., "Hikari Fiber Cable Gaihi no Tei Masatsuka ni Kansuru Kento (1)", NEN IEICE Communications Society Taikai Koen Ronbunshu 2, pp. 205, (lecture No. B-10-28), (Aug. 16, 1999).

Nagao, Yoshiaki et al., "Tei Masatsu Oyobi Tai Mamosei o Kojo saseta Nannen Hikari Drop Cable", NEN IEICE Communications Society Taikai Koen Ronbunshu 2, pp. 199 (lecture No. B-10-5), (Sep. 7, 2006).

Tsukamoto, Masayoshi et al., "Tei Masatsu Hikari Drop Cable no Kaihatsu", Proceedings of the 2006 IEICE General Conference Tsushin 2, pp. 338, (lecture No. B-10-18), (Mar. 8, 2006).

Umeo, Nobuhiro et al., "Tajo Fusetsu ni Tekishita Hikari Cable-yo Sheath Zairyo no Kento", Mitsubishi Cable Industries Review, pp. 30 to 35, No. 97, (Jan. 10, 2001).

International Search Report issued Sep. 29, 2009 in PCT/JP09/63918 filed Aug. 6, 2009.

U.S. Appl. No. 13/142,163, filed Jun. 24, 2011, Tsukamoto, et al.

Japanese Office Action mailed Apr. 23, 2013 in Japanese Patent Application No. 2008-204563 filed Aug. 7, 2008 (with English translation).

Office Action issued Oct. 9, 2013 in co-pending U.S. Appl. No. 13/142,163.

Office Action mailed Feb. 12, 2014 for Japanese Application No. 2008-204563 with English translation.

European search report dated Feb. 10, 2014 for European Application No. 09834965.7.

* cited by examiner

OPTICAL FIBER CABLE HAVING A SHEATH AND FOR SETTING IN A CONDUIT

FIELD OF THE INVENTION

The present invention relates to an optical fiber cable suitable for being set in a conduit.

DESCRIPTION OF THE RELATED ART

Heretofore, there has been a case where one or more optical fiber cables are set in a conduit by being inserted therethrough. In particular, in recent years when an optical fiber net as represented by FTTH (Fiber to the home) is expanding, it may be needed to set additional optical fiber cables in a conduit in which a predefined number of optical fiber cables has been previously set.

A method generally adopted for setting an optical fiber cable in a conduit is a construction method having steps of inserting a line-through rod through a conduit for bringing an optical fiber cable into the conduit, fixing the cable to an end of the line-through rod, and pulling the line-through rod into the conduit so as to insert the cable therethrough.

However, in the construction method, the line-through rod is inserted through the conduit, and then the cable is pulled into the conduit thereby. Accordingly, it requires insertion of the line-through rod and insertion of the cable.

To improve work efficiency, as a method for setting an optical fiber cable in a conduit, a construction method having a step of pushing the cable into the conduit may be adopted. In this construction method, only insertion of the cable is required. As a result, work efficiency is improved.

However, in a case where a dynamic friction coefficient between surfaces of optical fiber cables is large, the construction method makes slipping performance worse, the slipping performance between an optical fiber cable to be set and already-set optical fiber cables, and/or between optical fiber cables to be set when a plurality of optical fiber cables are to be set in the conduit. In addition, in a case where the conduit is long, the construction method makes the head of the cable unable to move forward in the conduit because of the friction even when the cable is pushed thereinto. As a result, the cable cannot be inserted thereinto any further, and accordingly cannot be inserted therethrough.

To solve the problems, Japanese Patent Application Laid-open Publication No. 2007-272199 discloses an optical fiber cable using an olefin series resin composition as a sheath, the composition in which talc including crystals having 3 to 10 μm in diameter is added to olefin resin, for improving the slipping performance and abrasion resistance. Further, Japanese patent No. 3929629 discloses an optical fiber cable using high-density polyethylene resin as material of a sheath for reducing surface friction resistance.

Although the optical fiber cable disclosed in Patent Document 1 can achieve low friction characteristics, the crystal part of the sheath may cause a crack in the sheath, and may reduce mechanical characteristics of the optical fiber cable such as impact characteristics thereof. Further, since the sheath includes the crystals, for example, an extruder's screw is abraded thereby, so that the ease of manufacture of the optical fiber cable may be reduced. Further, although the optical fiber cable disclosed in Patent Document 2 can achieve low friction characteristics, the use of high-density polyethylene resin may reduce the mechanical characteristics of the optical fiber cable such as impact characteristics thereof because the material of the sheath is hard.

The present invention is accomplished in view of the circumstances. An object of the present invention is to provide an optical fiber cable which is suitably set in a conduit by pushing the optical fiber cable into the conduit so as to insert the optical fiber cable therethrough, and which does not reduce the ease of manufacture of the optical fiber cable.

To solve the above problems and achieve the above object, an optical fiber cable of the present invention includes: an optical fiber core wire; and a sheath covering the optical fiber core wire, wherein a dynamic friction coefficient between a surface of the sheath of the optical fiber cable and a surface of a sheath of another optical fiber cable is 0.17 to 0.34, and a dynamic friction coefficient between the surface of the sheath of the optical fiber cable and a surface of a sheet composed of polyvinyl chloride is 0.30 to 0.40.

Further, in the optical fiber cable of the present invention, base resin of the sheath comprises 5 to 15% silicon resin by mass.

According to the present invention, an optical fiber cable can be obtained, the optical fiber cable which is suitably set in a conduit by pushing the optical fiber cable into the conduit so as to insert the optical fiber cable therethrough, and which does not reduce the ease of manufacture and the mechanical characteristics of the optical fiber cable.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

A description of an optical fiber cable of the present invention is given below in detail referring to the accompanying drawings.

Figure 1:
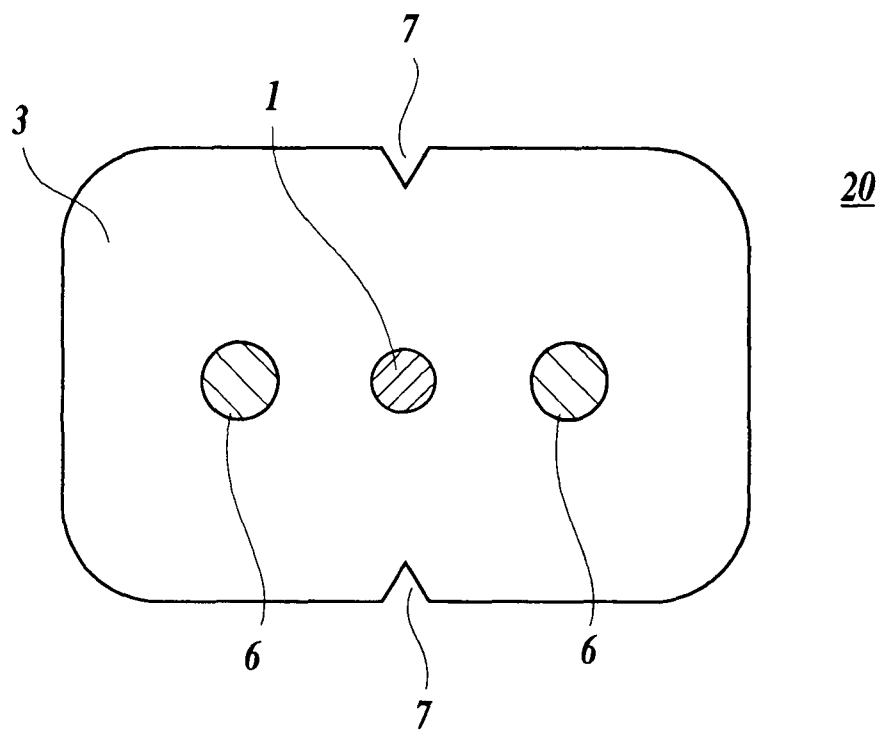
FIG. 1 is a cross-sectional view of an optical fiber cable according to an example of the present invention.

FIG.1 is a cross-sectional view of an optical fiber cable according to an example of the present invention. As shown in FIG.1, the optical fiber cable of the present invention includes: one so-called optical fiber core wire 1 having a glass optical fiber and a coating composed of ultraviolet curing resin, thermosetting resin, or the like on the outer circumference of the glass optical fiber; and a sheath 3 composed of non halogen flame retardant polyolefin or the like, and formed outside of the optical fiber core wire 1 such that the sheath 3 surrounds the optical fiber core wire 1 when the optical fiber cable 1 is viewed in cross section.

In addition, in FIG. 1, numerals 6,6 indicate tension members. The two tension members are deposited at both sides (the right side and the left side in FIG. 1) of the optical fiber core wire 1 with specified intervals. The central axes of the tension members 6,6 and the optical fiber core wire 1 are substantially on the same plane. Each of the tension members is composed of an aramid fiber bundle, fiber-reinforced plastic (FRP) including an aramid fiber as a reinforcement fiber, a steel wire, or the like. The outer diameter of the tension member is about 0.5 mm. These tension members 6,6 are used for protecting the optical fiber cable, of which the mechanical strength is inferior to the mechanical strength of the tension members 6, 6, when the optical fiber cable receives external force in the longitudinal direction thereof. In FIG. 1, the distances from the center of the optical fiber core wire 1 to the center of each of the tension members 6, 6 are approximately equal.

Further, numerals 7,7 indicate notches which are provided on outer surfaces of the sheath 3, respectively, as needed. The outer surfaces of the sheath 3 face to each other. Providing the notches 7,7 makes it easy to cut the sheath 3 and to take out the optical fiber core wire 1 from the sheath 3 when the optical fiber cable is set or the like.

In the optical fiber cable, as formed thereby, of the present invention, the dynamic friction coefficient between the surface of the sheath 3 of the optical fiber cable and a surface of a sheath 3 of another optical fiber cable of the present invention is 0.17 to 0.34, and the dynamic friction coefficient between the surface of the sheath 3 and a surface of a sheet composed of polyvinyl chloride (hereinafter, "PVC") is 0.30 to 0.40.

For making the optical fiber cable have the above-described dynamic friction coefficients, 5 to 15% silicon resin by mass is included in base resin of the sheath, for example.

The optical fiber cable of the present invention has a small dynamic friction coefficient between the surfaces of the sheaths. Consequently, even in a case where a plurality of the optical fiber cables is to be set, the setting thereof becomes easy.

Further, because the dynamic friction coefficient between the surface of the sheath and the surface of the sheet composed of PVC is small, the friction between a newly-set additional optical fiber cable and a previously-set optical fiber cable can be reduced. As a result, the setting of the additional optical fiber cable becomes easy.

The reason why the material of the sheet is PVC is that PVC is the most-commonly-used material for a sheath of the previously-set optical fiber cable.

Further, the optical fiber cable of the present invention does not reduce the ease of manufacture and the mechanical characteristics of the optical fiber cable.

EXAMPLE 1

The above restriction basis of the dynamic friction coefficients is explained below by using an example.

For the base resin of the sheath 3 of the optical fiber cable, the resin composed of non halogen flame retardant polyethylene was used. The optical fiber cable shown in FIG. 1 was manufactured by changing the proportion of silicon resin in the base resin, the proportion of crystals in the base resin, and the kind of the crystals, for changing the dynamic friction coefficient between the surfaces of the sheaths and/or between the surface of the sheath and the surface of the sheet composed of PVC. The ease of insertion of the optical fiber cable through a conduit and the ease of manufacture of the optical fiber cable were evaluated. Note that the surface roughness Ra of the surface of the sheath was 0.5 to 0.9.

Zinc-plated steel wires were used as the tension members 6,6.

The dimensions of each of the optical fiber cables were as follows:

the length of the long side (the length in the right-left direction in FIG. 1) was about 2.0 mm; and the length of the short side (the length in the top-bottom direction in FIG. 1, that is to say, the width) was about 1.6 mm.

Evaluation methods and evaluation standards are explained below.

[Dynamic Friction Coefficient Between Optical Fiber Cables]

Figure 2:
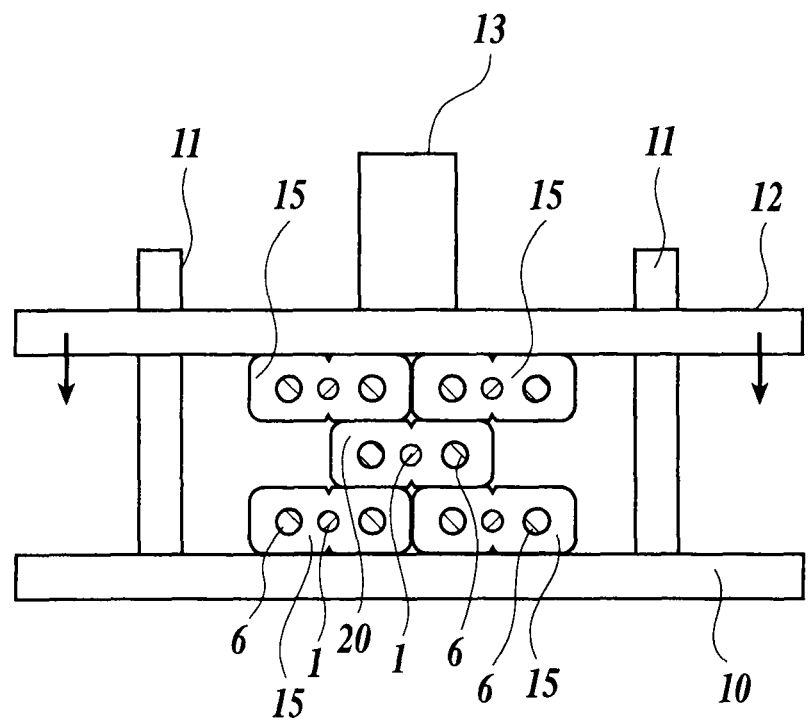
FIG. 2 is a schematic view showing a method for measuring a dynamic friction coefficient between a surface of a sheath of the optical fiber cable and a surface of a sheath of another optical fiber cable according to the example of the present invention.

At first, a method for measuring the dynamic friction coefficient between the surfaces of the sheaths 3 of the optical fiber cables is explained referring to FIG. 2. FIG. 2 is a schematic view showing the method for measuring the dynamic friction coefficient between the surfaces of the sheaths 3 of the optical fiber cables.

More specifically, on a base 10, two optical fiber cables 15,15 shown in FIG. 1, each of which had the length of 150 mm, were arrayed adjacent and parallel to each other. An optical fiber cable 20 with the length of 300 mm was stacked on the cables 15,15 as if straw bags were piled. Note that the cable 20 is a sample for the measurement of the friction coefficient. On this optical fiber cable 20 as the sample (measurement sample), the other two optical fiber cables 15,15, each of which had the length of 150 mm, were further stacked as if straw bags were piled as shown in FIG. 2.

Thereafter, a pressing plate 12 which slides up and down by being guided by a plurality of slide guides 11 was mounted on the stacked cables so as to be parallel to the base 10. Each of the slide guides 11 was deposited on the base 10 so as to vertically stand. Note that each of the optical fiber cables 15 and 20 is an optical fiber cable of the present invention.

Next, a weight 13 was mounted on the pressing plate 12, and a constant load of 19.6 N was applied to the pressing plate 12 in the arrow direction. In this state, the optical fiber cable 20 as the sample was pulled out frontward at a speed of 100 mm/min by using a load cell.

As dynamic friction force (pulling-out force) $F_D$, a value was employed, the value which was obtained at a position being 60 mm away from a position where the friction force was the lowest value after passing through the peak friction force obtained when the optical fiber cable 20 started to move. By using the value as the dynamic friction force $F_D$, a friction coefficient $\mu = F_D/19.6$ N was obtained. The number n of samples was set as n=3.

A testing environment was set such that the temperature was 23±2° C., and that the humidity was 50±10%.

The optical fiber cables 15 and 20 were replaced every time when the test was completed once (the number n of tests=1).

[Dynamic Friction Coefficient Between Sheath and PVC Sheet]

Figure 3:
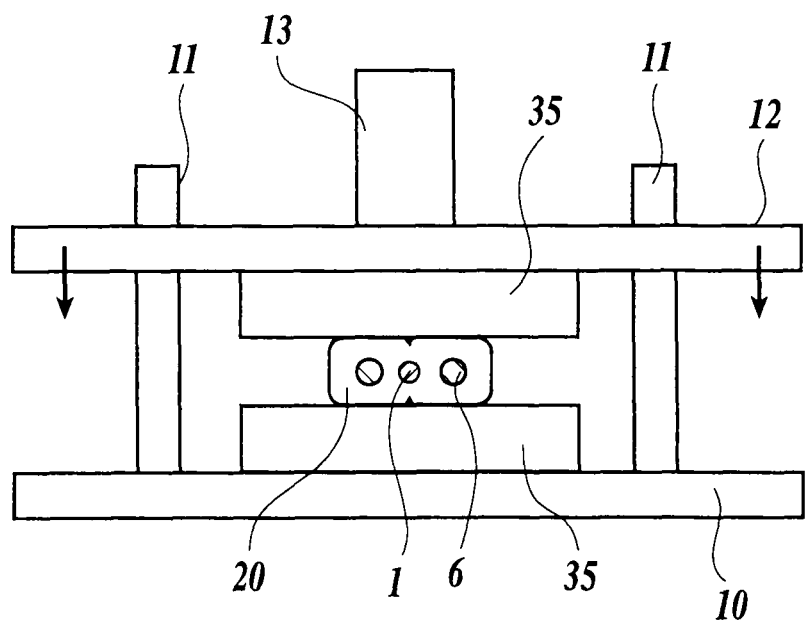
FIG. 3 is a schematic view showing a method for measuring a dynamic friction coefficient between the surface of the sheath of the optical fiber cable and a surface of a sheet composed of polyvinyl chloride.

FIG. 3 is a schematic view showing a method for measuring the dynamic friction coefficient between the surface of the sheath 3 and the surface of the sheet composed of PVC.

More specifically, four optical fiber cables 15, 15, 15, 15 used in the method for measuring the dynamic friction coefficient between the surfaces of the sheaths of the optical fiber cables shown in FIG. 2 were replaced by two sheets 35,35. Each of the optical fiber cables 15, 15, 15, 15 was 150 mm in length, and each of the sheets 35,35 was 5 mm in width, 1 mm in thickness, and 150 mm in length, and composed of PVC. Except this point, the method for measuring the dynamic friction coefficient between the surface of the sheath 3 and the surface of the sheet 35 is the same as the method for measuring the dynamic friction coefficient between the surfaces of the sheaths 3 of the optical fiber cables shown in FIG. 2.

The surface roughness Ra of the sheets 35,35 was 0.8. Note that the surface roughness Ra of previously-set optical fiber cables composed of PVC is generally 0.7 to 1.0.

[Ease of Insertion Through Conduit]

Figure 4:
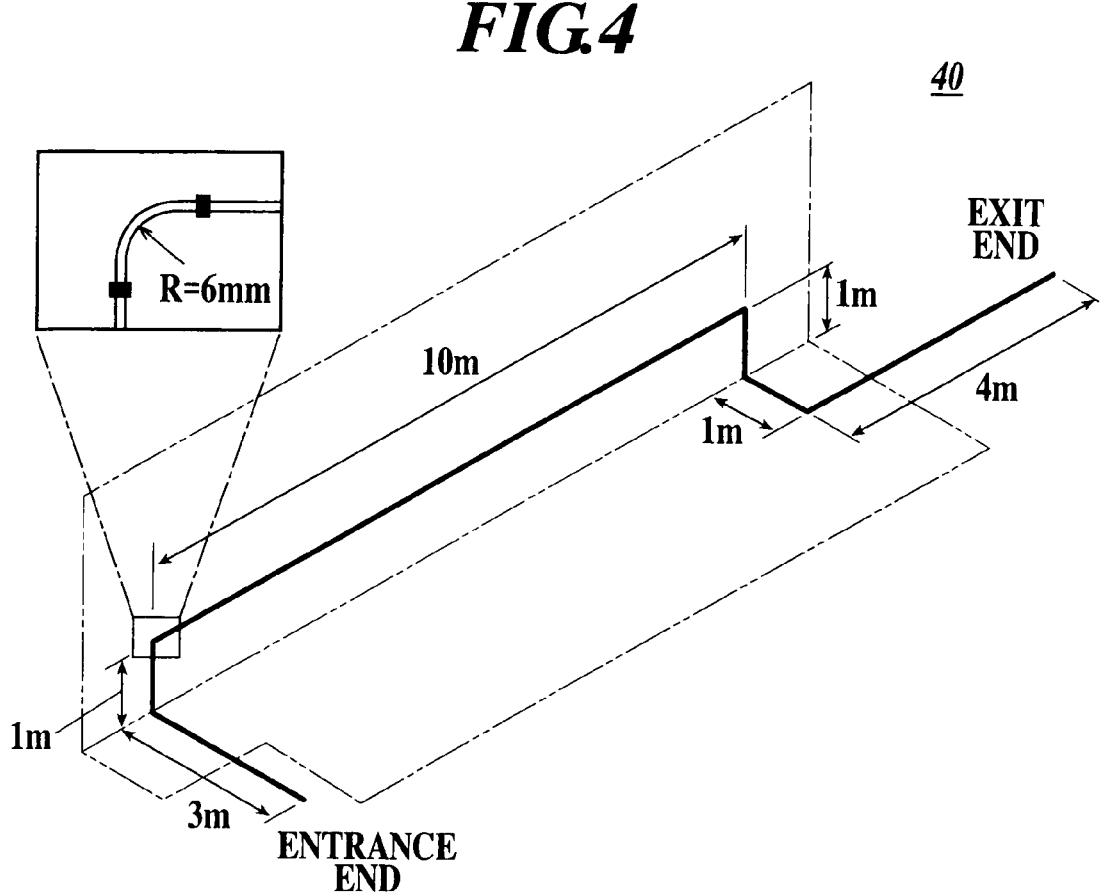
FIG. 4 is a schematic view showing a method for evaluating the ease of insertion of the optical fiber cable through a conduit.

The ease of insertion of the optical fiber cable through the conduit was evaluated by using a conduit 40 as shown in FIG. 4.

The conduit 40 was 22 mm in inside diameter and 20 m in total length, and composed of a synthetic resin. As shown in FIG. 4, the conduit 40 had five bending parts, each of which was formed by bending the conduit 40 to a 90 degree angle, and had the curvature radius R of 6 mm. The bending parts were provided at positions which were 3 m, 4 m, 14 m, 15 m, and 16 m away from the entrance end of the conduit 40, respectively. The conduit 40 was disposed such that a part thereof from the entrance end to a position being 3 m away from the entrance end and a part thereof from a position being 15 m away from the entrance end to a position being 20 m away from the entrance end were on a plane parallel to the floor, and a part thereof from the position being 3 m away from the entrance end to the position being 15 m away from the entrance end was on a plane perpendicular to the floor.

One or more optical fiber cables were previously set in the conduit 40. Each of the previously-set cables was 8.7 mm in diameter, had a circular section, and had a sheath composed of PVC.

The optical fiber cable 20, which is the measurement sample, was inserted through the conduit 40 by being pushed thereinto. The number of the cables 20 inserted through the conduit 40 was counted. It was defined that when 30 optical fiber cables 20 were inserted through the conduit 40, the ease of insertion of the optical fiber cable 20 through the conduit 40 was evaluated as good.

[Ease of Manufacture]

The ease of manufacture of the optical fiber cable was evaluated by the load change of a motor of the extruder while the sheath was being extruded. It was defined that when the load change of the extruder's motor was equal to 5% or more, the ease of manufacture of the optical fiber cable was evaluated as poor (x). It is because the load change of the motor causes the change of the outer diameter of the sheath.

[Impact Test]

Figure 5:
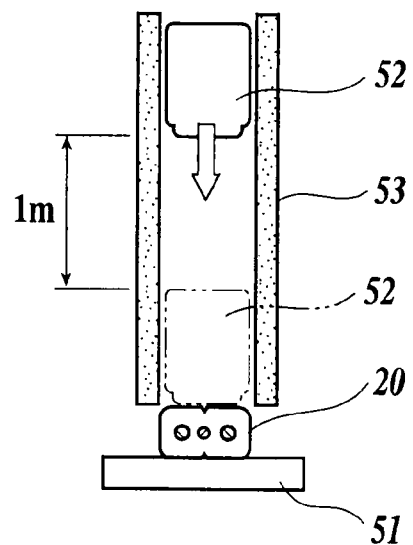
FIG. 5 is a schematic view showing a method of an impact test.

An impact test was carried out for the evaluation of the mechanical characteristics of the optical fiber cable. FIG. 5 is a schematic view showing a method of the impact test.

An iron plate 51 was deposited so as to be horizontal. The optical fiber cable 20 was deposited on the iron plate 51 such that the long side of the cable 20 was disposed in the horizontal direction. A cylindrical iron bar 52 was dropped on the cable 20 from a height of 1 m in the vertical direction. The iron bar 52 was 20 mm in diameter and 300 g in weight.

In an impact tester 50, a guide tube 53 was set so as to prevent the falling orbit of the iron bar 52 from deviating from the vertical direction. The inside diameter of the guide tube 53 was slightly larger than the outer diameter of the iron bar 52, so that the iron bar 52 was dropped within the guide tube 53.

Moreover, a corner part made by the end facet of the iron bar 52, the end facet colliding with the optical fiber cable 20, and the side facet of the iron bar 52, was chamfered so as to have a curvature radius R=5 mm.

It was defined that when the sheath was cracked and the tension members were exposed, the mechanical characteristics of the optical fiber cable were evaluated as poor (x). If such an optical fiber cable is actually set, the optical fiber cable may cause a problem, for example, that the tension members are eroded.

The evaluation results obtained by the above-described evaluations are shown in Table 1.

TABLE 1

|  | SAMPLE 1 | SAMPLE 2 | SAMPLE 3 | SAMPLE 4 | SAMPLE 5 | SAMPLE 6 | SAMPLE 7 |
|---|---|---|---|---|---|---|---|
| PROPORTION OF SILICON RESIN | 0 wt % | 3 wt % | 5 wt % | 10 wt % | 15 wt % | 20 wt % | 25 wt % |
| DYNAMIC FRICTION COEFFICIENT BETWEEN SHEATHS | 0.60 | 0.42 | 0.21 | 0.20 | 0.18 | 0.16 | 0.15 |
| DYNAMIC FRICTION COEFFICIENT BETWEEN SHEATH AND PVC SHEET | 0.67 | 0.52 | 0.35 | 0.32 | 0.31 | 0.28 | 0.25 |
| EASE OF INSERTION | 0 | 5 | 30 | 30 | 30 | 30 | 30 |
| EASE OF MANUFACTURE | ◯ | ◯ | ◯ | ◯ | ◯ | X | X |
| IMPACT CHARACTERISTICS | ◯ | ◯ | ◯ | ◯ | ◯ | ◯ | ◯ |

As shown in Table 1, as for the samples 3 to 7, each of which had the dynamic friction coefficient between the surfaces of the sheaths of the optical fiber cables being equal to 0.34 or less and the dynamic friction coefficient between the surface of the sheath and the surface of the sheet composed of PVC being equal to 0.40 or less, 30 optical fiber cables or more were inserted through the conduit. That is to say, the ease of insertion of the samples 3 to 7 through the conduit was good.

Further, the ease of manufacture of the samples 3 to 5 was good, each of the samples 3 to 5 having the dynamic friction coefficient between the surfaces of the sheaths of the optical fiber cables being equal to 0.17 or more and the dynamic friction coefficient between the surface of the sheath and the surface of the sheet composed of PVC being equal to 0.30 or more. In addition, the mechanical characteristics of all of the samples 1 to 7 were good.

That is to say, when the dynamic friction coefficient between the surfaces of the sheaths of the optical fiber cables was 0.17 to 0.34, and the dynamic friction coefficient between the surface of the sheath of the optical fiber cable and the surface of the sheet composed of PVC was 0.30 to 0.40, the optical fiber cable was suitably set in the conduit by pushing the optical fiber cable into the conduit so as to insert the optical fiber cable therethrough, and did not reduce the ease of manufacture and the mechanical characteristics of the optical fiber cable.

By the way, FIG. 1 shows the example of the optical fiber cable having the optical fiber core wire 1, namely, having one optical fiber core wire. Instead of the optical fiber core wire 1, a so-called optical fiber ribbon having a plurality of optical fiber core wires which are arranged in parallel on a plane and bundled by coating may be used. Moreover, the number of the optical fiber ribbons may be one or more. The entire disclosure of Japanese Patent Application No. 2008-204563 filed on Aug. 7, 2008 including description, claims, drawings, and abstract are incorporated herein by reference in its entirety.

The invention claimed is:

1. An optical fiber cable comprising:
an optical fiber core wire; and
a sheath covering the optical fiber core wire such that the sheath surrounds the optical fiber core wire when the optical fiber cable is viewed in cross section, wherein
a dynamic friction coefficient between a surface of the sheath of a first optical fiber cable and a surface of a sheath of a second optical fiber cable is 0.17 to 0.34, the sheaths of first optical fiber cable and the second optical fiber cable being of a same material composition,
a dynamic friction coefficient between the surface of the sheath of the optical fiber cable and a surface of a sheet composed of polyvinyl chloride is 0.30 to 0.40, and
a base resin of the sheath of the optical fiber cable is greater than 5% and less than or equal to 15% silicon resin by mass.

2. The optical fiber cable according to claim 1, further comprising a tension member integrally formed in the sheath.

3. The optical fiber cable according to claim 2, wherein the tension member is a wire.

4. The optical fiber cable according to claim 3, wherein the tension member is formed longitudinally along the same plane as the optical fiber core wire.

* * * * *